(12) United States Patent
Calcev et al.

(10) Patent No.: US 8,245,028 B2
(45) Date of Patent: *Aug. 14, 2012

(54) METHOD AND APPARATUS FOR DYNAMIC, SEAMLESS SECURITY IN COMMUNICATION PROTOCOLS

(75) Inventors: George Calcev, Hoffman Estates, IL (US); Bogdan O Carbunar, Schaumburg, IL (US); Madjid F. Nakhjiri, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,304

(22) Filed: Dec. 3, 2010

(65) Prior Publication Data

US 2011/0075845 A1     Mar. 31, 2011

Related U.S. Application Data

(62) Division of application No. 11/458,222, filed on Jul. 18, 2006, now Pat. No. 7,865,717.

(51) Int. Cl.
*H04L 29/06* (2006.01)
(52) U.S. Cl. .......................................... 713/153; 726/14
(58) Field of Classification Search .................. 726/2, 3, 726/11–14; 380/28, 30, 277–279, 285; 713/150, 713/151, 153, 171; 709/238–240
See application file for complete search history.

(56) References Cited

U.S. PATENT DOCUMENTS

| 6,092,191 | A | 7/2000 | Shimbo et al. |
| 7,068,791 | B1 | 6/2006 | Larsen et al. |
| 7,234,063 | B1 | 6/2007 | Baugher et al. |
| 2002/0112154 | A1 | 8/2002 | Wallace, Jr. |
| 2003/0167342 | A1 | 9/2003 | Munger et al. |
| 2003/0172289 | A1* | 9/2003 | Soppera ........................ 726/4 |
| 2004/0025018 | A1* | 2/2004 | Haas et al. ................. 713/168 |
| 2005/0198282 | A1 | 9/2005 | Stahl et al. |

(Continued)

FOREIGN PATENT DOCUMENTS

EP     1571790 A2     7/2005

(Continued)

OTHER PUBLICATIONS

Chung Kei Wong, et al., "Secure Group Communications Using Key Graphs", IEEE/ACM Transactions on Networking, vol. 8, No. 1, Feb. 2000, 1-15.

(Continued)

*Primary Examiner* — Gilberto Barron, Jr.
*Assistant Examiner* — Abdulhakim Nobahar
(74) *Attorney, Agent, or Firm* — Anthony P. Curtis; Daniel R. Bestor

(57) ABSTRACT

Communication nodes, acting as intermediate routers for communication packets transmitted between a source node and a destination node, are provided with different access rights to the fields of the routed communication packets. Routes of intermediate routers between the source node and the destination node are discovered and the identities of intermediate routers on the discovered routes are collected. The aggregate trust levels of the intermediate routers are computed allowing the most trusted route to be selected. Encryption keys are securely distributed to intermediate routers on the most trusted route based on the trust level of the intermediate routers and fields of the communication packets are encrypted with encryption keys corresponding to the assigned trust level. Intermediated nodes are thereby prevented from accessing selected fields of the communication packets.

16 Claims, 3 Drawing Sheets

U.S. PATENT DOCUMENTS

| | | | |
|---|---|---|---|
| 2005/0198351 | A1 | 9/2005 | Nog et al. |
| 2005/0216727 | A1 | 9/2005 | Chattopadhyay et al. |
| 2005/0216730 | A1 | 9/2005 | Morino et al. |
| 2005/0235362 | A1 | 10/2005 | England et al. |
| 2005/0251491 | A1 | 11/2005 | Medina et al. |
| 2005/0251680 | A1 | 11/2005 | Brown et al. |
| 2006/0173968 | A1 | 8/2006 | Vaarala et al. |
| 2007/0113274 | A1 | 5/2007 | Hariharan |
| 2007/0186281 | A1* | 8/2007 | McAlister .................. 726/14 |
| 2007/0258468 | A1 | 11/2007 | Bennett |
| 2007/0297405 | A1 | 12/2007 | He |
| 2008/0222415 | A1 | 9/2008 | Munger et al. |

FOREIGN PATENT DOCUMENTS

| | | |
|---|---|---|
| WO | 2006070172 A1 | 7/2006 |

OTHER PUBLICATIONS

Sanzgiri, et al. "A Secure Routing Protocol for Ad Hoc Networks", Network Protocols, 2002, Proceedings 10th IEEE International Conference, Nov. 12-15, 2002, Piscataway, NJ, USA, IEEE, Nov. 12, 2002, pp. 78-87.

Office Action Dated Apr. 29, 2010 for U.S. Appl. No. 11/458,222.

Notice of Allowance Dated Nov. 8, 2010 for U.S. Appl. No. 11/458,222.

PCT International Search Report Dated Nov. 22, 2007 for U.S. Appl. No. 11/458,222.

Pirzada, et al. "Establishing Trust in Pure Ad-Hoc Networks", XP-002366737, Jan. 18, 2004, 8 Pages.

Xiaoqi, et al. "A Trust Model Based Routing Protocol for Secure Ad Hoc Networks", 2004 IEEE Aeorspace Conference Proceedings, Jun. 2004, 10 Pages.

Zhaoyu, et al. "A Dynamic Trust Model for Mobile Ad Hoc Networks", Proceedings of the 10th IEEE International Workshop on Future Trends of Distributed Computing Systems (FTDS'04), May 2004, 6 Pages.

International Preliminary Report on Patentability for International Application No. PCT/US2007/069435 mailed on Jan. 29, 2009.

* cited by examiner

METHOD AND APPARATUS FOR DYNAMIC, SEAMLESS SECURITY IN COMMUNICATION PROTOCOLS

BACKGROUND

Security and privacy represent important issues in modern communication over fixed or mobile wireless networks. The classical protocol of communication stack recommended by OSI is continuously changed to accommodate new routing techniques. For instance, routing can not only be implemented in the third (routing) layer of communication protocols but also in the second (link) layer, as proposed by Mesh Networks, or at upper layers (i.e. application layer), as proposed by peer-to-peer networks. By providing intermediate nodes access to data packets, network communication is inherently insecure. In seamless mobility scenarios, nodes can act in an ad-hoc manner as routers for packets sent by others. In certain scenarios, such nodes can even act as bridges between different networks. Such networks can have different access restrictions to the fields of the packets forwarded. Moreover, nodes acting as bridges might need rights to access more packet fields than regular routing nodes.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
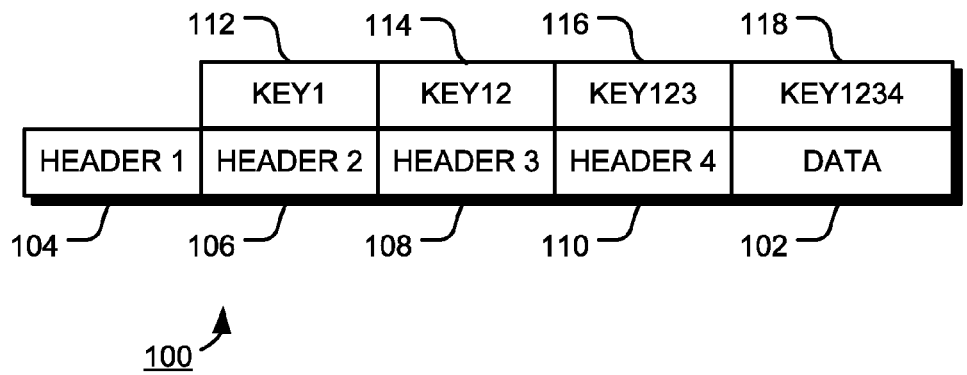
FIG. 1 is a diagram of an exemplary communication packet consistent with certain embodiments of the invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to a protocol for data encryption for communication networks such that the intermediate nodes (known as routers) have limited but personalized access to data packets they handle. The protocol allows communicating parties to encrypt each field (header or payload) of the communication packets separately and to constrain their visibility, through the use of encryption, to intermediate nodes acting as routers. The access could be limited on a need-to-know basis or as part of a mechanism rewarding cooperation. For example, the protocol provides the communication end-points (the source destination nodes) with the ability to dynamically change the access rights, based on the behavior of intermediate routers. Misbehaving routers that drop or modify packets can cause the end-point devices to choose different routing routes or severely limit the access to the fields of the routed packets. Well-behaved routers may receive more credentials, in the shape of decryption keys, allowing them to access more fields of the routed packets. This feature is based on the assumption that routed packets contain information (payload, routing information, location information, the existence of a remotely accessible printer) that is useful to third parties.

This protocol not only allows different access patterns for different intermediate routers based on their trust level, but also allows setting different overall security levels, based on the application type. For instance, highly secure communications should hide as many headers as possible from the intermediate routers, while still permitting routing to take place. At the other end of the spectrum, applications with low security levels may use fewer or no encryption keys.

The protocol provides a systematic solution for network privacy and security using a hierarchical encryption of data packets. Each layer of communication adds or subtracts finite and fixed segments of the data frame called headers.

When data is routed from source to destination, based on the protocol type, the intermediate nodes need to access only a subset of the information contained in the data frame. In one embodiment, headers are encrypted in the data frame such that an intermediate node can access information based on the role it plays and its trust level. In addition, the node access rights may be changed dynamically based on history and communication needs.

FIG. 1 is a diagram of an exemplary communication packet consistent with certain aspects of the invention. In FIG. 1, communication packet 100 includes a data payload 102 and headers 104, 106, 108 and 110. The packet is encrypted with a multitude of hierarchical encryption keys.

Header 1, 104, is not encrypted, but Header 2, 106, is encrypted using encryption key K1. Header 3, 108 is encrypted using encryption key K12, which may be an independent key or a hierarchical key derived from K1. Similarly, Header 4, 110 is encrypted using encryption key K123, which may be an independent key or a hierarchical key derived from K12. The data payload 102 is encrypted using the key K1234. A router that only has the public key corresponding to K1 can only access Header 1 and Header 2. It does this by decrypting Header 2 using the public key corresponding to K1 to recover, for example, routing information in the header.

If a node has the key corresponding to K123, for example, it has access only to the first four headers of the packet, but not to the payload. The selection of keys can be done in a hierarchical manner, by the communication endpoints, such that their generation and transfer overhead are minimized. Methods of key generation, including hierarchical key generation, are known to those of ordinary skill in the art.

Figure 2:
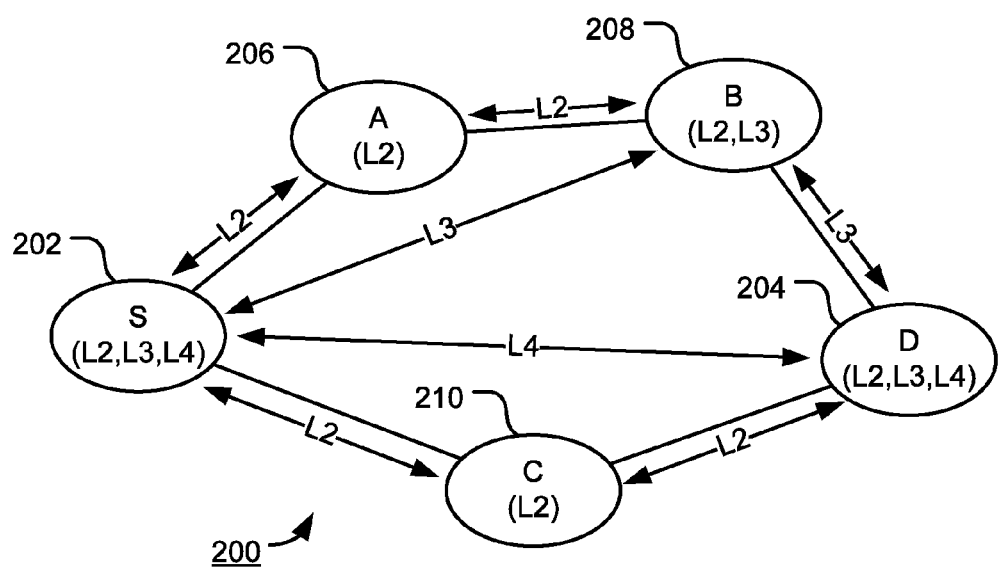
FIG. 2 is a diagram illustrative of key distribution in a communication network consistent with certain embodiments of the invention.

Key Distribution. FIG. 2 is a diagram illustrative of key distribution in a communication network 200 consistent with certain aspects of the invention. Referring to FIG. 2, each source node S has a unique private and public key pair (Kpr, Kpu), along with a public key certificate signed by a globally trusted entity. The public key certificate contains the identities of the trusted entity and of S, the validity interval of the certificate and the public key Kpu of S. The certificate also contains a hash of the previously mentioned fields, signed by the trusted entity.

The nodes have personalized access to packet headers and payload, as shown in FIG. 2. FIG. 2 shows an example of a network, with node S (202) as the source node and node D (204) as the destination node. Node S and D have two communication routes between them, one going through node A (206) and node B (208) and one only through node C (210). Nodes are labeled with their corresponding access rights (decryption keys) for the transmitted packets. For example, nodes S and D have keys L2, L3 and L4, allowing them maximum access to the transmitted packets. However, nodes A and C have only key L2, allowing them only to route packets.

Figure 3:
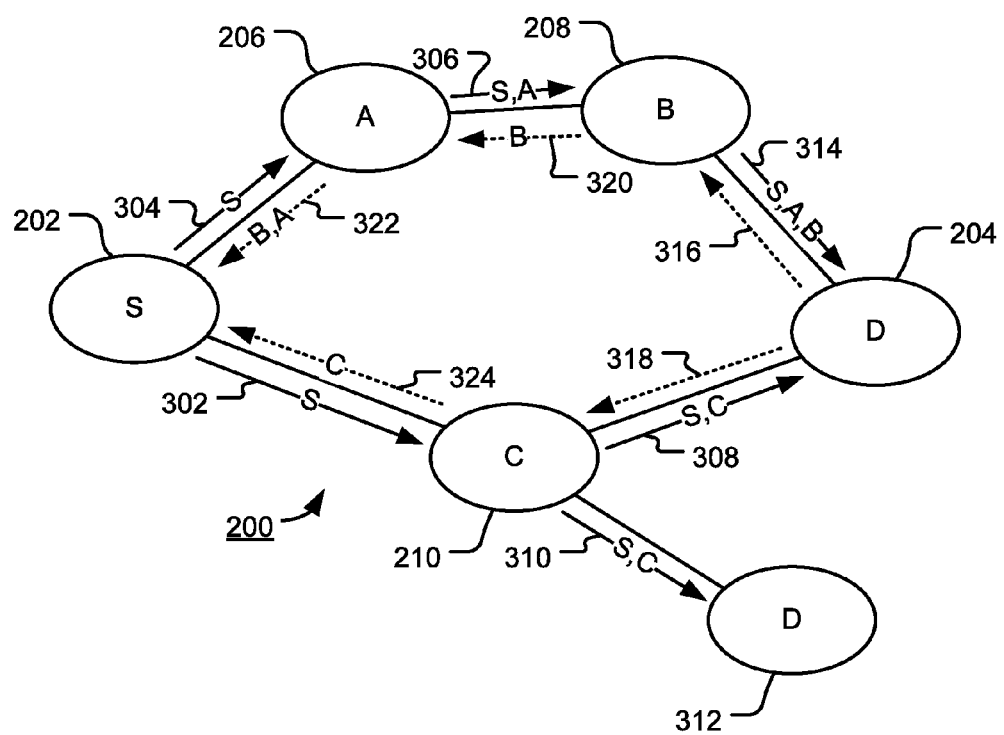
FIG. 3 is a diagram illustrative of route discovery in a communication network consistent with certain embodiments of the invention.

Route Discovery. When the source node S (202) wants to send data to the destination node D (205), it first initiates a route discovery procedure. Route discovery procedures are well known in the art, and include reactive procedures such as Ad-hoc On-demand Distance Vector (AODV) routing or Dynamic Source Routing (DSR). FIG. 3 is a diagram illustrative of route discovery in a communication network consistent with certain aspects of the invention. In FIG. 3, the solid arrows denote RREQ messages and the broken arrows denote RREP messages. During the key discovery procedure, Node S distributes its public key certificate in a Route Request (RREQ) message. In FIG. 3, the RREG message 302 and 304 is sent to neighboring nodes 206 and 210. The RREQ message also contains other parameters (used for instance in AODV) such as route request ID that identifies the route request, a sequence number used to avoid the loops, time to live (TTL) and network size. Once authenticated, the public key Kpu can be used by any node in the network to send encrypted data to Node S.

The route request message RREQ is forwarded until it reaches the destination Node D. Node A adds its own address to the RREQ message and rebroadcasts it as RREQ message 306. Similarly, Node C adds its own address to the RREQ message and rebroadcasts it as RREQ message 308 to the destination node D and as RREQ message 310 to node D (312). Node B adds its own address to the RREQ message and rebroadcasts it as RREQ message 314 to the destination node D.

2. When Nodes A, B and C receive the RREQ message, they may return a Route Reply (RREP) message if they have a route to the destination in their data base. In this case, the source node may send out a credentials request (CREQ) message to the destination node along the discovered route. The destination node which will reply with credentials reply (CREP) message that is sent back to the source node via the discovered route. The CREP message, which is very similar to the RREP message, includes the trust list and the intermediate keys that are added en route. The exchange of message CREQ and CREP messages allows existing trust values to be updated. For instance, if the destination node modifies its trust list it can send a CREP to the source node. In a further embodiment, if a node receiving a RREQ message has a route to the destination in its data base, the RREQ message may be forwarded along the route as a unicast massage to the destination node. This approach reduces the amount of messaging required.

3. When the destination Node D receives the RREQ message, it responds with a route reply (RREP) message containing its public key certificate and a list containing a mapping between each intermediate node (A, B and C) and a trust level (or access rights). The list may be encrypted with the public key provided by source node S and signed with the private key of the destination node D. Note that the destination node D can receive multiple RREQ messages (308 and 314 in FIG. 3) initiated by the source node S, each bearing the same route request ID, though along different routes (i.e. going through different intermediate nodes). For each such message, the destination node D generates an RREP message as previously described. Thus node D responds to RREQ message 314 with RREP message 316 and to RREQ message 308 with RREP message 318.

4. When an intermediate node receives a RREP message it adds its own public key certificate before sending it to its predecessor in the route. Optionally, it can encrypt its rights with the public key of the source node S. The intermediate node updates its data base with the route ID, the next hop neighbor in the route (the node from it received RREP) and the final destination node for that route. A procedure that avoids route loops can also be implemented based on the sequence number of RREQ. In FIG. 3, node B (208) receives RREP message 316, adds its own public key certificate and transmits the RREP message 320 to node A (206). Node A receives RREP message 320, adds its own public key certificate and transmits the RREP message 322 to node S. Similarly, node C (208) receives RREP message 308, adds its own public key certificate and transmits the RREP message 324 to node S (202).

5. When the RREP reaches the source node S, it will contain the public key certificates of all the intermediate nodes (including the destination node), as well as the destination node's list of trust levels/access rights of intermediate nodes. This allows the source node to collect the identities of the intermediate routers on the discovered routes. The source node S verifies the validity of the certificates of the destination node D and all the intermediate nodes. This process allows the source node and the destination node to authenticate with each other, and allows the intermediate routers to authenticate to the source and destination node.

6. For each intermediate node, I, the source node S computes an intersection between the access rights of I in the source node's view and the access rights of I in the destination node's view. For example, if Node A is allowed to access headers 1 through 4 in the source node's view but only headers 1 through 3 in the destination node's view, it will only be allowed to access headers 1 through 3 during the communication session between S and D. If, for a given route between S and D, there exists an intermediate node I who's previously generated access rights are null, S drops the route. If no route exists between S and D with enough access rights, no communication can safely take place between them. If multiple routes with enough access rights exist between S and D, node S selects the one with the most trusted weakest intermediate router. The route is selected because it has the highest aggregate trust level.

7. The source node S then generates new encryption keys, K1, K12, K123 and K1234. For each intermediate node I, based on I's access rights, it selects the appropriate key, as described in step 6, encrypts it with the public key of I and signs it with the source node's private key. It then sends the results to each intermediate node that in turn verifies the source node's signature and reveals it access key.

Data Routing. During routing, each intermediate node can access fields of packets as decided by the communication endpoints (Nodes S and D). If the trust level of an intermediate node is reduced during the protocol, due to failure to route or other malicious behavior, the endpoints can decide to revoke the encryption keys, and repeat the route discovery and key distribution protocol, so that the aggregate trust levels are updated and new keys are redistributed to the intermediate nodes. However, if the rating of a node increases, because of cooperative behavior for example, the endpoints can send the node a new, higher level encryption key. For example, if Node A has key K12 but its trust level increases significantly, Nodes S and D can send it key K123, allowing it to access also the content of Header 4 in FIG. 1.

Protocol Extensions the route discovery phases of existing routing protocols (AODV, DSR) may be extended with two message types. The two new messages are used to implement the key distribution phase efficiently.

The first extension is a Screening Policy Preference KEY_REQUEST message. The fields for this message may include:

Key Usage ID. This field is an identifier that specifies the security procedure for which the key requested is required. This could be encryption or authentication of a message at the TCP/IP stack layer or other security protection mechanisms. For instance (using the example introduced in Figure) if the sender needs to have access to IP headers of an otherwise encrypted packet, the sender indicates that is needs L3 level decryption keys.

Sender ID. This field is an identifier that specifies the identities of the sender.

Receiver ID. This field is an identifier that specifies the identity of the traffic source (node S (202) in FIG. 2).

Public Key of Sender. This field specifies the public key of the sender of the KEY_REQUEST message, and may comprise a certificate.

The second extension is a Screening Policy Preference KEY_RESPONSE message. This message is sent by an intermediate node (nodes C, D or E in FIG. 2) and contains the security policy preference of the sender of this message. For example, the sender states that it needs to be able to access IP headers. The fields for this message may include:

Trust Level. This field specifies the trust level granted to the target of encryption.

Security Key. This field specifies the key granted for usage, corresponding with the content of the Trust Level field. This key is encrypted and sent with the public key of the recipient of the message carrying this extension (sender of the KEY_REQUEST message) and is signed by the sender.

Figure 4:
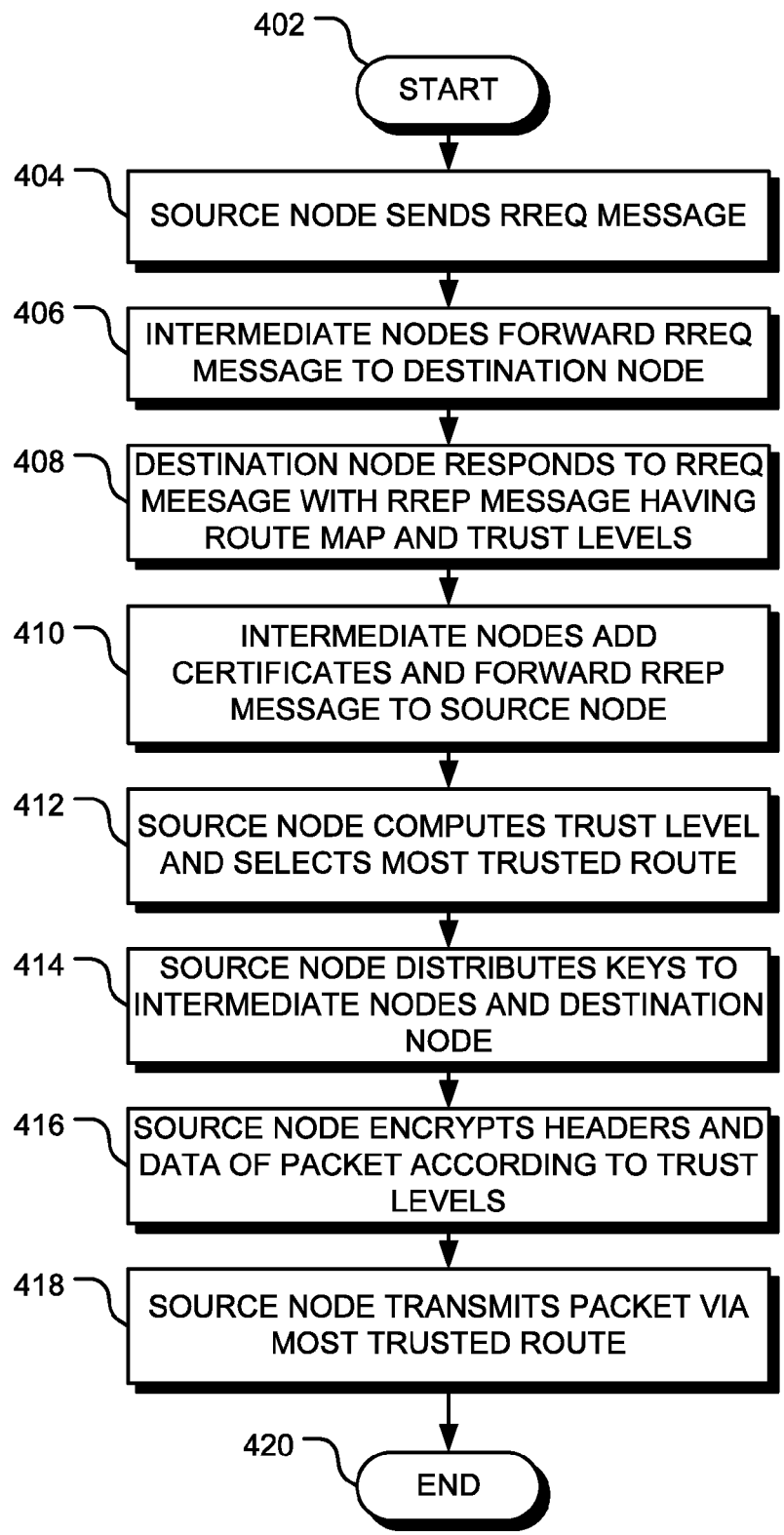
FIG. 4 is a flow chart of a method for secure communication consistent with certain embodiments of the invention

FIG. 4 is a flow chart of a method for secure communication consistent with certain embodiments of the invention. Following start block 402 in FIG. 4, a source node wishing to communicate with a destination node broadcasts a RREQ message on the network at block 404. Each intermediate node receiving the REEQ message adds its own address to the message and forwards it at block 406. This process is repeated and one or more RREQ messages arrive at the destination node if a route exists. At block 408 the destination node transmits a RREP message to the network. The RREP message contains the message and a list of trust levels (in the view of the destination node) and is routed back to the source using the intermediate node addresses in the RREQ message. As each intermediate node receives the RREP message, it adds its own certificate and forwards the message towards the source at block 410. At block 412, the source node receives the RREP message and, using the list of trust levels from the destination node and its own list of trust levels, selects the most trusted route to the destination node. The most trusted route may be selected by computing the aggregate trust levels of the intermediate routers. The aggregate trust level may be, for example, the minimum value of the trust levels of the intermediate router assessed by the source node and the destination node. At block 414, the source node distributes keys to the intermediate node on the most trusted route. These keys will allow the intermediate nodes access selected parts of the communication packet. At block 416, the source node performs a hierarchical encryption of the communication packet according to the trust levels of the intermediate nodes and, at block 418, transmits this packet to the destination node along the most trusted route. The process terminates at block 420.

Any node may maintain a list of trust levels of connected nodes. These trust levels may be updated according to the behavior the nodes.

In one embodiment, X509 public key certificates are generated and used with public and secret key encryption protocols on hx4700 and MPX communicating devices, both running Pocket PC. The nodes are set up to work in wireless ad-hoc mode. The method may be implement using code (such as C#, Compact Framework). The protocol may be included in ad-hoc routing protocol, such as AODV or DSR, known to those of ordinary skill in the art.

The protocol allows mobile devices to communicate securely, while disclosing only information deemed to be necessary to third parties acting as routers.

Very little user interaction is required. Based on locally maintained blacklists, devices can automatically compute trust levels of intermediate routers, generate encryption keys, distribute keys and separately encrypt/decrypt the fields of communication packets.

The present invention, as described in embodiments herein, is implemented using a programmed processor of a network device executing programming instructions that control the network device to operate as broadly described above in flow chart form. The programming instructions can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made without departing from the present invention. Such variations are contemplated and considered equivalent.

Those skilled in the art will appreciate that the program steps and associated data used to implement the embodiments described above can be implemented using disc storage as well as other forms of computer readable media, such as, for example, Read Only Memory (ROM) devices, Random Access Memory (RAM) devices, optical storage elements, magnetic storage elements, magneto-optical storage elements, flash memory and/or other equivalent storage technologies without departing from the present invention. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for providing communication nodes, acting as intermediate routers for communication packets transmitted between a source node and a destination node, with different access rights to the fields of the routed communication packets, the method comprising:
- at a source node, discovering a plurality of routes of intermediate routers between the source node and the destination node;
- at a source node, collecting the identities of the intermediate routers on each of the plurality of discovered routes;
- at a source node, computing the aggregate trust levels of the intermediate routers for each of the plurality of discovered routes;
- at a source node, selecting a most trusted route of the discovered routes based on the computed aggregate trust levels;
- at a source node, computing, and securely distributing, encryption keys to each intermediate router on the most trusted route based on the trust level of the respective intermediate router; and
- at a source node, encrypting fields of the communication packets with corresponding encryption keys.

2. A method in accordance with claim 1, further comprising the source node and the destination node authenticating with each other.

3. A method in accordance with claim 2, further comprising authenticating the intermediate routers to the source and destination nodes.

4. A method in accordance with claim 2, wherein the source node and the destination node authenticating with each other, comprising sending messages containing public key certificates of the corresponding device.

5. A method in accordance with claim 1, further comprising redistributing encryption keys based on behavior of the intermediate routers.

6. A method in accordance with claim 1, wherein collecting identities of intermediate routers on the routes comprises adding public key certificates of the intermediate routers to messages sent from the intermediate routers.

7. A method in accordance with claim 1, wherein computing the aggregate trust levels of the intermediate routers comprises taking the minimum value of the trust levels of the intermediate router assessed by the source node and the destination node.

8. A method in accordance with claim 1, wherein selecting the most trusted route of the discovered routes comprises the source node selecting among all the discovered routes the route with the most trusted weakest intermediate router.

9. A method in accordance with claim 1, further comprising the source node generating encryption keys for each field of the communication packets.

10. A method in accordance with claim 1, wherein securely distributing encryption keys to intermediate routers on the most trusted route comprises the source node encrypting the key with a public key of the intermediate router and signing the encrypted key with the private key of the source node.

11. A method in accordance with claim 1, wherein computing encryption keys is performed by the source node.

12. A method in accordance with claim 1, further comprising:
- detecting malicious behavior of intermediate routers; and
- if malicious behavior is detected in a intermediate router:
  - reducing the trust level of the intermediate router;
  - updating the aggregate trust levels of the intermediate routers;
  - selecting a new most trusted route of the discovered routes; and
  - distributing new encryption keys to the intermediate routers on the new most trusted route in accordance with the reduced trust level of the intermediate router.

13. A method in accordance with claim 1, further comprising:
- detecting cooperative behavior of intermediate routers; and
- if cooperative behavior is detected in a intermediate router:
  - increasing the trust level of the intermediate router;
  - updating the aggregate trust levels of the intermediate routers;
  - selecting a new most trusted route of the discovered routes; and
  - distributing new encryption keys to the intermediate routers on the new most trusted route in accordance with the increased trust level of the intermediate router.

14. A method in accordance with claim 1, wherein securely distributing the encryption keys comprises providing a different number of encryption keys to the intermediate routers on the most trusted route based on the trust level of the intermediate routers.

15. A method in accordance with claim 14, wherein the fields of each communication packet comprises a plurality of headers in addition to a data payload, and encrypting fields of the communication packets comprises encrypting each header using a different encryption key and encrypting the data payload using an encryption key that is different from the encryption key used for encrypting any of the headers.

16. A method in accordance with claim 1, wherein encrypting the fields of the communication packets with corresponding encryption keys comprises encrypting at least a header portion of the communication packets such that it is decryptable by at least one intermediate router using said distributed encryption keys and encrypting at least an encrypted data portion of the communication packets such that it is not decryptable by at least one intermediate router using said distributed encryption keys.

* * * * *

UNITED STATES PATENT AND TRADEMARK OFFICE
CERTIFICATE OF CORRECTION

PATENT NO.       : 8,245,028 B2
APPLICATION NO.  : 12/960304
DATED            : August 14, 2012
INVENTOR(S)      : Calcev et al.

Page 1 of 1

It is certified that error appears in the above-identified patent and that said Letters Patent is hereby corrected as shown below:

On the Title Page, in item (75), under "Inventors", in Column 1, Line 2, delete "O" and insert -- O. --, therefor.

On Page 2, in item (56), under "OTHER PUBLICATIONS", in Column 2, Line 11, delete "Aeorspace" and insert -- Aerospace --, therefor.

In Column 3, Line 18, delete "RREQ" and insert -- RREQ (Route Request) --, therefor.

In Column 3, Line 19, delete "RREP" and insert -- RREP (Route Reply) --, therefor.

Signed and Sealed this
Twenty-second Day of January, 2013

David J. Kappos
*Director of the United States Patent and Trademark Office*